United States Patent [19]

Noser et al.

[11] Patent Number: 4,930,585
[45] Date of Patent: Jun. 5, 1990

[54] DEVICE FOR DRILLING BOREHOLE UNDERCUTS

[75] Inventors: Martin Noser, Vaduz, Liechtenstein; Fritz Mark, Mäder, Austria

[73] Assignee: Hilti Aktiengesellschaft, Fürstentum, Liechtenstein

[21] Appl. No.: 328,114

[22] Filed: Mar. 23, 1989

[30] Foreign Application Priority Data

Mar. 23, 1988 [DE] Fed. Rep. of Germany ....... 3809761

[51] Int. Cl.$^5$ .......................... B28D 1/14; E21B 7/28
[52] U.S. Cl. .................... 175/220; 175/202; 175/273; 408/151
[58] Field of Search ............... 175/220, 273, 263, 279, 175/202, 203; 408/150, 151

[56] References Cited

U.S. PATENT DOCUMENTS

| 2,585,038 | 2/1952 | Rogacki | 408/151 X |
| 3,000,240 | 9/1961 | Eckardt | 408/151 |
| 3,146,641 | 9/1964 | Benjamin et al. | 408/151 X |
| 3,233,480 | 2/1966 | Briney, Jr. et al. | 408/151 |
| 3,250,155 | 5/1966 | Armstrong | 408/151 X |

FOREIGN PATENT DOCUMENTS 231720 8/1987 European Pat. Off. .

Primary Examiner—Stephen J. Novosad
Attorney, Agent, or Firm—Toren, McGeady & Associates

[57] ABSTRACT

A device for drilling an undercut (1b) in a borehole (1a) in a target material 1, includes an axially extending guide sleeve (13) containing an axially extending eccentric bore, an eccentric bushing (14) is supported rotatably in the guide sleeve and a drive shaft (15) is supported rotatably in the eccentric bushing. A housing (10, 12) laterally encloses the guide sleeve and bears against the surface of the target material. A blocking member (25) is positioned between the housing (10, 12) and the guide sleeve (13) for permitting rotation of the guide sleeve in only one rotational direction relative to the housing (10, 12). Due to the blocking member (25) entrainment of the guide sleeve (13) is prevented when the eccentric bushing is rotated in the direction opposite to the one rotational direction.

10 Claims, 3 Drawing Sheets

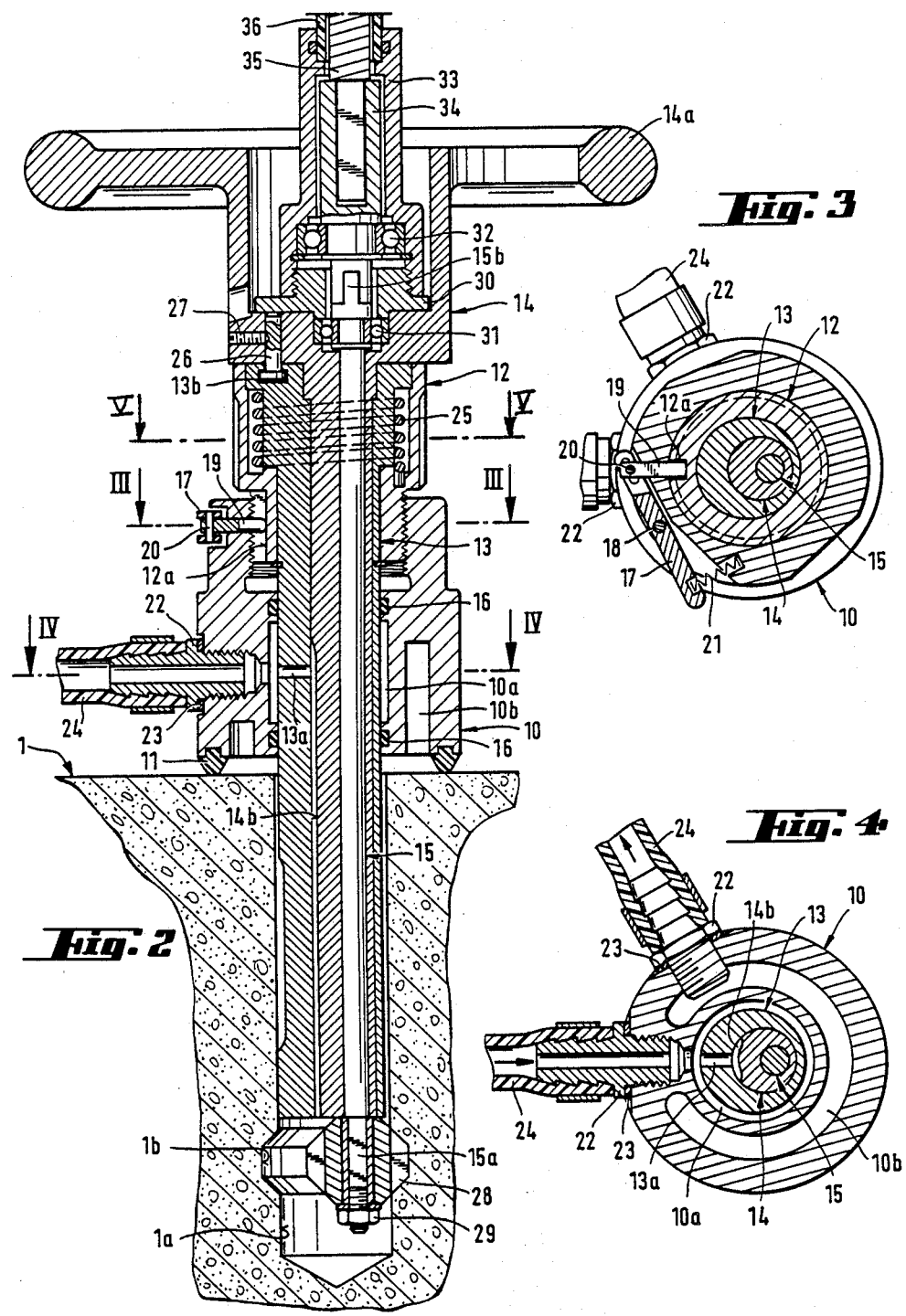

DEVICE FOR DRILLING BOREHOLE UNDERCUTS

BACKGROUND OF THE INVENTION

The present invention is directed to a device for drilling undercuts in boreholes in a target material where the device includes a housing abutting against the surface of the target material with a guide sleeve containing an eccentrically arranged axially parallel bore in which an eccentric bushing having a handle is supported so that it can be rotated through an angle limited to approximately 180°. A drive shaft, including a cutter head, coupled with a driving unit, is rotatably supported in the eccentric bushing.

Undercut sections in boreholes are formed mainly for receiving appropriately shaped anchor dowels so that the dowel can be anchored in a positive manner in the undercut. Because of the expensive and/or malfunction-prone devices for cutting the undercuts, such anchor dowels have not achieved notable success up to the present time.

In AT-PS 368 244, a device for forming undercuts is disclosed which is relatively difficult to handle and includes a guide sleeve, an eccentric bushing rotatably supported in the sleeve, and a drive shaft with a cutter head rotatably supported in the bushing. The eccentricity of the guide sleeve corresponds roughly to the eccentricity of the bushing. Accordingly, the drive shaft is located centrally in the bushing in one extreme position of the guide sleeve and the bushing. In the other extreme position, rotated through an angle of approximately 180°, the drive shaft is displaced radially outwardly by double the amount of eccentricity. Between these two extreme positions, the cutter head penetrates into the borehole surface. After the complete penetration, the eccentric bushing and the guide sleeve are rotated together through an angle of approximately 360°. During such rotation, a circumferentially extending undercut is formed in the borehole surface. Subsequently, the eccentric bushing must be rotated in the guide sleeve through 180° in either rotational direction for positioning drive shaft centrally in the guide sleeve so that it can be removed from the borehole. The guide sleeve and the eccentric bushing each have a separate handle for effecting rotation.

In EU-PA 0 231 720 there is another known device which is quite expensive in view of the improvement in the device. Such device functions in the same general manner as described above with the guide sleeve rotatably supported in an enclosing housing. The eccentric bushing is connected to a toothed ring, engageable with a worm shaft driven by a transmission. The eccentric bushing and the guide sleeve can be coupled together by an axially shiftable pin. After insertion of the device in a borehole, with the drive shaft arranged centrally, the eccentric bushing in the guide sleeve is rotated through 180° by the transmission, until the shiftable pin rests against a stop in the guide sleeve. During subsequent further rotation of the transmission, the guide sleeve, along with the eccentric bushing, is rotated by the pin. After forming a complete undercut, the pin is shifted axially out of engagement, so that the eccentric bushing can be rotated further in the guide sleeve until the bore in the eccentric bushing is arranged centrally in the guide sleeve and the device can be removed from the borehole.

SUMMARY OF THE INVENTION

Therefore, the primary object of the present invention is to provide a simple device for drilling undercut sections in boreholes where the device is easy to handle and operates on the known eccentric arrangement.

In accordance with the present invention, a blocking member is provided between the housing and the guide sleeve, permitting rotation of the guide sleeve in only one direction within the housing.

Due to the use of the blocking member in the present invention, a certain amount of free travel is available between the housing and the guide sleeve, so that the guide sleeve can be rotated in only one rotational direction within the housing, while it is blocked against movement in the opposite rotational direction. Thus, an arrangement of the guide sleeve and the eccentric bushing can be provided enabling rotation of the eccentric bushing within the guide sleeve through 180°. Such an arrangement can, for instance, consist of an annular groove extending through 180° with a pin engageable in the groove. The drilling device is inserted into a borehole when the eccentricities of the eccentric bushing and the guide sleeve cancel one another out, so that the drive shaft is arranged centrally in the guide sleeve. After inserting the drilling device into the borehole until its housing abuts the surface of the target material containing the borehole, the eccentric bushing is rotated in the guide sleeve up to the stop, at which point the cutter head commences its penetration into the surface of the borehole. During further rotation, the guide sleeve follows along with the eccentric bushing, because of the stop. After the eccentric bushing and the guide sleeve have rotated through 360°, the undercut has been completed and the eccentric bushing can be rotated in the opposite direction in the guide sleeve through 180°, again locating the drive shaft in the center of the sleeve. In this position, the guide sleeve is prevented from further rotation with the eccentric bushing due to the blocking member.

Preferably, the blocking member is a wrap-around spring. Basically, a wrap-around spring is a helical spring wound tightly around a part, so that it is in frictional contact with the part. One free end of the wrap-around spring is connected with the other part so that it cannot rotate relative to it. In one rotational direction, the helical wrap-around spring is unwound by the friction and remains in sliding contact with the part it encloses. In the opposite rotational direction, the wrap-around spring is wound more tightly around the part effecting a braking action due to the friction. The essential advantage of a wrap-around spring is that it is very easy to manufacture and can be housed in a limited space.

Another advantageous embodiment involves the use of a grip roller and expanding friction clutch as the blocking member. Grip roller free wheels can be produced as finished components, so that they require approximately as much space as a similar ball-bearing and are relatively inexpensive.

In another desirable embodiment, the blocking member can be formed as a ratcheting device. A ratcheting device essentially contains a set of teeth with a pawl engaging the teeth. A blocking action in one rotational direction can be effected by an appropriately asymmetrically designed profile of the teeth or by the arrangement of the rotational point of the pawl.

It is advantageous to construct the housing in two parts with one housing part bearing against the surface of the target material containing the borehole and with the guide sleeve in abutment with the other housing part. The other housing part is displaceable in the axial direction relative to the one housing part and the blocking member is arranged between the guide sleeve and the other housing part. With the housing formed in two parts, it is possible to provide the undercuts at different depths in the borehole. This feature is significant to avoid drilling into a reinforcing bar or rod which is located at the same depth in the borehole as the undercut.

The two housing parts can be connected together by a thread. Due to the threaded connection, displacement of the housing parts relative to one another is possible. To prevent loosening or displacement on the thread during the drilling operation as a result of vibrations, the two housing parts can be interconnected in a relatively non-rotational manner by a detent element which can be shifted out of engagement. The threaded connection enables an accurate axial adjustment of the housing parts relative to one another.

In another feature of the invention, a flexible shaft extends between the drive shaft and its driving unit. The flexible shaft compensates for any lateral displacement resulting from the eccentric motion of the drive shaft in the borehole. Further, the flexible shaft also compensates for any offset between the axis of the borehole and the driving unit if they are not accurately aligned. Commercially available units can be used as flexible shafts.

In an advantageous arrangement, the housing includes annular spaces with supply and discharge connections for flowing cooling water to the drill head through flow passages. The arrangement of such flow passages to the drill head enables the use of diamond tipped tool bits which require cooling water for the drilling process as well as for carrying off drillings and for preventing dust generation. An outer annular space preferably serves for carrying off the cooling water and can be sealed by an elastic sealing packing formed of rubber or plastics material.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 2 is an enlarged sectional view of a portion of the drilling device displayed in FIG. 1;

FIG. 3 is a transverse sectional view of the drilling device taken along the line III—III in FIG. 2;

FIG. 4 is another transverse cross-sectional view of the drilling device illustrated in FIG. 2 and taken along the line IV—IV;

DETAILED DESCRIPTION OF THE INVENTION

Figure 1:
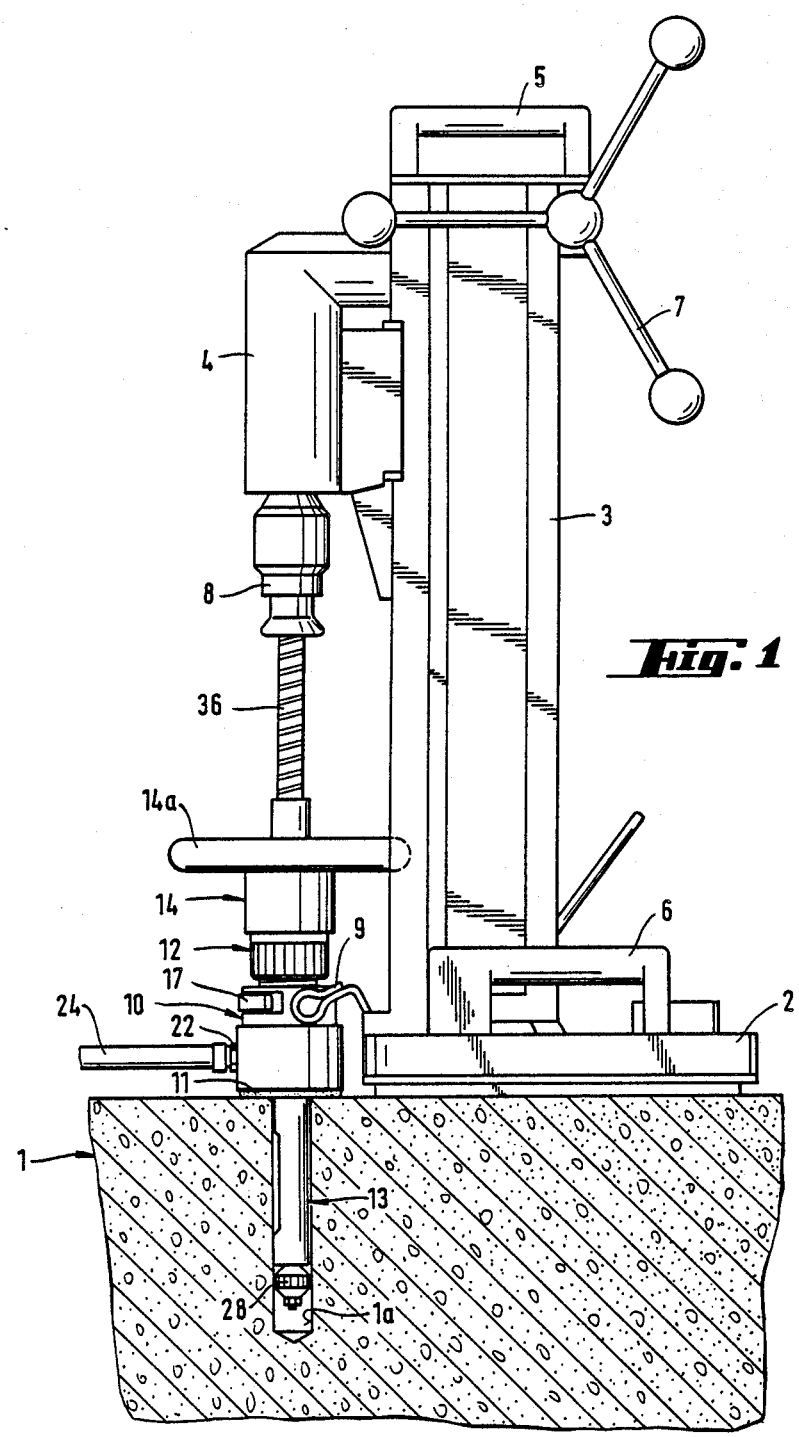
FIG. 1 is a side elevational view of a drilling device embodying the present invention mounted on a target material and including a drive unit displaceable along a support column.

In FIGS. 1-4, a drilling device is illustrated which cuts an undercut 1b in the surface of a borehole 1a drilled into a target material 1, so that an appropriately shaped dowel can be anchored in a positive manner in the undercut. The drilling device includes a base plate 2, note FIG. 1, mounted on the surface of the target material 1, into which the borehole 1a has been drilled. A support column 3 extends upwardly from the base plate 2 and a driving unit 4 is displaceably mounted on the support column. At the upper end of the support column 3 and at the base plate 2, the drilling device is provided with carrying handles 5, 6 for more effective handling. A hand wheel 7, located at the upper end of the support column 3, displaces the driving unit 4 along the column. At its lower end, driving unit 4 has a tool bit holder or chuck 8. At the lower end of the support column 3, a clamping lever 9 presses a housing 10 against the surface of the target material 1. Housing 10 is sealed against the target material by an elastic sealing packing 11. In addition to the housing part 10, the housing includes a threaded sleeve 12, extending upwardly from the housing part 10, with the two parts connected together by means of a thread.

A guide sleeve 13 is rotatably supported in the housing part 10 and in the other housing part or threaded sleeve 12. Guide sleeve 13 has an eccentrically arranged bore extending in parallel relation with the axial direction of the housing or the drilling direction. An eccentric bushing 14 forming an axially extending eccentrically arranged bore is located within the eccentric bore of the guide sleeve 13 so that it can be rotated therein to a limited extent. Eccentric bushing 14 has a ring-shaped handle 14a at its upper end for rotating the bushing within the guide sleeve 13. In addition, a drive shaft 15 is rotatably supported in the eccentric bushing 14. Housing 10 includes an inner annular space 10a, and an outer annular space 10b, note FIG. 4. Annular space 10a, spaced radially inwardly from the outer annular space, is sealed against the guide sleeve 13 by axially spaced sealing rings 16. A triggering lever 17 is supported in the housing 10 and is pivotally mounted about an axis 18 disposed in parallel relation with the axis of the drilling device. Triggering lever 17 is connected in an articulated manner with a bolt 19, note FIGS. 2 and 3, by means of a pin 20. A compression spring 21 holds the triggering lever in the position displayed in FIG. 3. Bolt 19 extends radially inwardly into an axially extending groove 12a in the threaded sleeve or housing part 12 and provides a rotational lock between the housing 10 and the sleeve 12. When the triggering lever is actuated, bolt 19 is displaced out of the groove 12a and the sleeve 12 can be rotated with respect to the housing 10. As a result, sleeve 12 can adjust the drilling device in the axial direction. Such adjustment is important if the undercut 1b happens to coincide with the location of a reinforcing bar. Reinforcing bars, where the target material is reinforced concrete, can cause very pronounced wear of the drill bit. With the triggering lever actuated and the bolt 19 displaced, the axial position of the undercut can be changed by rotating the sleeve 12 relative to the housing 10.

Inner annular space 10a and outer annular space 10b are connected to separate hoses 24, note FIG. 4, with the connection being provided by stubs 22 and sealing disks 23. Hoses 24 serve to supply and discharge cooling water used in the drilling operation. In particular, cooling water is required if diamond tipped tool bits are used. On one hand, cooling water cools the tool bit and, on the other hand, it carries drilled material away from the tool bit through a channel 14b and a radial bore 13a.

Above the housing part 10, in the other housing part or sleeve 12, a wraparound spring 25 extends between the threaded sleeve 12 at it lower end and the guide sleeve 13 at its upper end, note the radially outwardly extending shoulder on the guide sleeve. Wrap-around spring 25 serves as a blocking member, whereby guide sleeve 13 can be rotated in the housing 10 or the threaded sleeve 12 only in one rotational direction. In place of the wraparound spring 25, a free-wheeling device, such as a grip roller and expanding friction clutch, can be utilized (note FIGS. 6 and 7).

Figure 5:
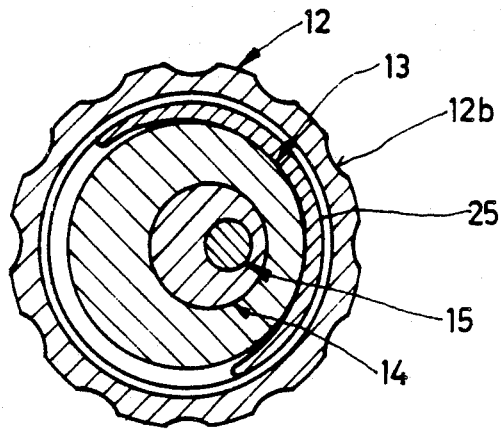
FIG. 5 is a transverse sectional view of the drilling device taken along the line V—V in FIG. 2 with details out of the plane of the section not illustrated.

In FIG. 5, the threaded sleeve 12 is provided around its circumference with indentations 12b for turning the threaded sleeve. Guide sleeve 13 with the eccentric bushing 14 and the drive shaft 15 are rotatably supported in the threaded sleeve 12. The wraparound spring 25 with one end connected to the guide sleeve 12 enables turning of the guide sleeve 13 only in the clockwise direction relative to the threaded sleeve. If the guide sleeve 13 is turned counter-clockwise, the wraparound spring is wound around the guide sleeve and in this way turning of the guide sleeve 13 is blocked.

Figure 6:
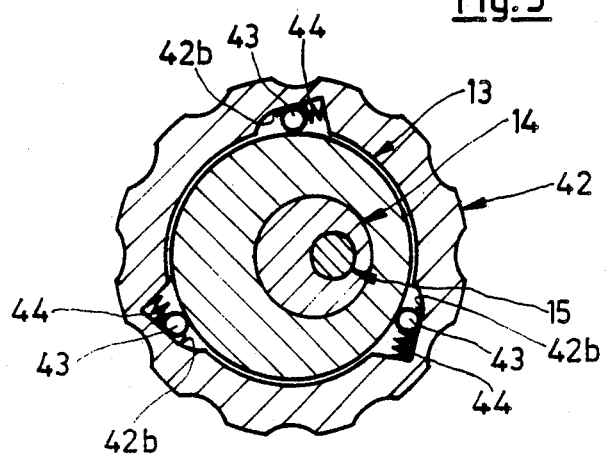
FIG. 6 is a transverse sectional view of another embodiment of the portion of the drilling device displayed in FIG. 5.

In FIG. 6, the wraparound spring 25 is replaced by a grip roller free wheel or overrunning clutch or sprag clutch. This part consists basically of rollers 43 which roll on run-up surfaces 42b of a threaded sleeve 42. Rollers 43 are pressed by compression springs 44 clockwise against the contour surface of the guide sleeve. Accordingly, the guide sleeve 13 can only be turned clockwise with respect to the threaded sleeve 42.

Figure 7:
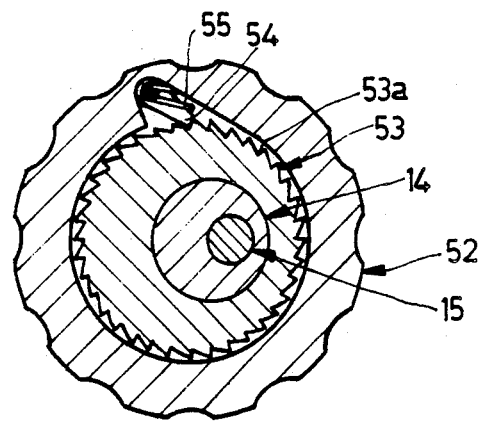
FIG. 7 is a transverse sectional view of a further embodiment of the portion of the drilling device illustrated in FIG. 5.

FIG. 7 provides a third embodiment with the wraparound spring 25 as shown in FIG. 5 replaced by a ratchet mechanism. In this Figure, the guide sleeve 53 is provided about its circumference with a set of teeth 53a having a saw toothed-shaped profile. A pawl 54 is pivotally supported in a threaded sleeve 52. Pawl 54 is pressed by a torsion spring 55 clockwise against the set of teeth 53a. The set of teeth 53a is arranged so that the guide sleeve 53 can be turned clockwise with respect to the threaded sleeve 52. If the guide sleeve 53 is turned counter-clockwise, however, the pawl 54 blocks such motion. Instead of a single pawl, several pawls distributed around the circumference can be used.

A stop 26 in the form of a headed bolt is positioned in the upper part of the eccentric bushing 14 and is secured in place by a threaded pin 27 extending radially inwardly through the bushing 14. The head portion of the stop 26 extends into an arc-shaped groove 13b in the upper end of the guide sleeve 13. Arc-shaped groove 13b extends around the drilling axis for an angle of approximately 180° and limits the rotatability of the eccentric bushing 14 within the guide sleeve 13. Rotation of the eccentric bushing 14 in the guide sleeve 13 is necessary so that a cutter head 28 positioned on the drive shaft 15 can be moved from a central position, as shown in FIG. 1, into a fully shifted eccentric position as displayed in FIG. 2. The headed end of the stop 26 serves also to secure the axial position of the eccentric bushing 14 relative to the guide sleeve 13. After inserting the drilling device into a previously drilled borehole 1a, initially, the eccentric bushing 14 is rotated by means of the handle 14a through approximately 180° with respect to the guide sleeve 13. Cutter head 28 is secured on the lower end of guide shaft 15 by a nut 29 and extends into the borehole 1a as shown in FIG. 1. The non-rotational connection of the cutter head 28 to the drive shaft 15 is effected by polygonal member 15a, note FIG. 2. At its upper end, that is the opposite end from the cutter head 28, drive shaft 15 has a spline nose 15b. A flange 30 axially secures a bearing 31 about the upper end of the drive shaft 15 so that it is rotatably supported. At the upper side of the flange 30, there is another bearing 32. A coupler 33 is connected with the flange 30 and engages a coupling part 34 connected by the spline nose 15b with the drive shaft so that there is no relative rotation between them. Coupling part 34 is connected with a flexible shaft 35 so that it rotates with the shaft. Flexible shaft 35, in turn, is connected with the chuck 8 in the drive unit 4. For protection, flexible shaft 35 is encased in an elastic sheathing tube 36. Flexible shaft 35 compensates for any lateral offset of the drilling device with respect to the driving unit.

After the drive shaft 15 is located in the eccentric position illustrated in FIG. 2, the handle 14a is rotated further in the same rotational direction. As a result, the guide sleeve 13 is carried along by the stop 26. When the eccentric bushing 14 and the guide sleeve 13 have been rotated through one complete revolution, the undercut 1b is completed. In the removal of the drilling device from the borehole, the eccentric bushing 14 is turned by the handle 14a in the opposite rotational direction by half a revolution and the drive shaft is returned into the central position. The wrap-around spring 25 prevents an entrainment of the guide sleeve 13. With the drive shaft centered, the drilling device can be removed out of the borehole 1a.

While specific embodiments of the invention have been shown and described in detail to illustrate the application of the inventive principles, it will be understood that the invention may be embodied otherwise without departing from such principles.

We claim:

1. Device for drilling an undercut section in a borehole in a target material comprising a housing (10, 12) arranged to abut an outer surface of a target material containing the borehole, an axially extending bore extending through said housing, a guide sleeve (13) mounted in said bore in said housing and having an eccentric bore in axially parallel relation with said housing bore, an eccentric bushing (14) positioned within said eccentric bore in said guide sleeve and rotationally displaceable through an angle of approximately 180° relative to said guide sleeve, a drive shaft (15) having a cutter head (28) thereon rotatably supported in said eccentric bushing, a driving unit coupled to said drive shaft, wherein the improvement comprises blocking means (25) disposed between said housing and said guide sleeve for permitting rotation of said guide sleeve relative to said housing in only one rotational direction.

2. Device, as set forth in claim wherein said blocking member is a wraparound spring (25).

3. Device, as set forth in claim 2, wherein said wraparound spring laterally encircles said guide sleeve and extends in the axial direction between said housing and said guide sleeve.

4. Device, as set forth in claim 1, wherein said blocking member comprises a grip roller and expanding friction clutch.

5. Device, as set forth in claim 1, wherein said blocking member is a ratchet member.

6. Device, as set forth in claim 1, wherein said housing comprises two housing parts (10, 12) with one said housing part (10) arranged to bear against the target material, and the other said housing part (12) is interconnected with said one housing part and extends from said one housing part on the opposite side thereof from the target material, said guide sleeve extends axially through said housing parts, said guide sleeve bears against said other housing part and is axially displaceable relative to said one housing part, and said blocking means comprising a wraparound sleeve arranged around said guide sleeve and extending in the axial direction between said guide sleeve and said other housing part.

7. Device, as set forth in claim 6, wherein said housing parts (10, 12) are threadably interconnected.

8. Device, as set forth in claim 1, wherein a flexible shaft (35) extends between said drive shaft and said driving unit.

9. Device, as set forth in claim 1, wherein said housing comprises annular spaces with means for supplying cooling water to one of said annular spaces and for withdrawing cooling water to the other said annular space, whereby said cooling water flows to and from said cutter head via flow passages extending axially from said annular spaces to said cutter head.

10. Device, as set forth in claim 6, wherein means are provided in said housing parts for locking said housing parts against relative rotational movement and said means being displaceable between a locked position and a released position so that in the released position, said housing parts are rotationally movable relative to one another.

* * * * *